United States Patent
Kinch

(10) Patent No.: US 9,512,919 B2
(45) Date of Patent: Dec. 6, 2016

(54) TRANSMISSION HYDRAULIC CONTROL SYSTEM

(71) Applicant: Ford Global Technologies, LLC, Dearborn, MI (US)

(72) Inventor: Derek Kinch, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 14/666,616

(22) Filed: Mar. 24, 2015

(65) Prior Publication Data

US 2016/0281843 A1    Sep. 29, 2016

(51) Int. Cl.
*F16H 63/34* (2006.01)
*F16H 63/48* (2006.01)

(52) U.S. Cl.
CPC ........ *F16H 63/483* (2013.01); *F16H 63/3483* (2013.01); *F16H 2200/2012* (2013.01); *F16H 2200/2046* (2013.01)

(58) Field of Classification Search
CPC .... F16H 63/483; F16H 63/3483; F16H 63/48; F16H 63/3433; F16H 61/0206; F16H 2061/0209; F16H 2200/2012; F16H 2200/2046
See application file for complete search history.

(56) References Cited

U.S. PATENT DOCUMENTS

| | | | |
|---|---|---|---|
| 7,597,644 B2 | 10/2009 | Rodgers, II | |
| 8,545,362 B1 * | 10/2013 | Goleski | F16H 3/66 475/277 |
| 8,579,094 B2 | 11/2013 | Moorman et al. | |
| 8,777,798 B2 | 7/2014 | Borgerson et al. | |
| 2009/0107136 A1 * | 4/2009 | Gierer | F16H 61/0021 60/459 |
| 2013/0319806 A1 * | 12/2013 | Schindler | F16H 63/3483 188/353 |
| 2014/0034437 A1 | 2/2014 | Berger et al. | |
| 2014/0248989 A1 | 9/2014 | Hart et al. | |

\* cited by examiner

*Primary Examiner* — Richard Lorence
(74) *Attorney, Agent, or Firm* — James Dottavio; Brooks Kushman P.C.

(57) ABSTRACT

An automatic transmission uses 6 shift elements applied in combinations of four to establish ten forward speed ratios and a reverse speed ratio. The automatic transmission uses a hydraulic control system to control engagement of the six elements, control engagement of a torque converter bypass clutch, control engagement of a parking pawl, and to provide fluid for a hydrodynamic torque converter and for lubrication. The parking pawl is disengaged in response to engagement of two of the six shift elements and remains disengaged in response to engagement of other shift elements. A single valve controls several different functions associated with the two-pass torque converter. Pressurized fluid is provided by a variable displacement engine driven pump and also by an electric pump. A priority valve reduces lubrication flow when other fluid demands are high as indicated by the pump displacement control circuit.

19 Claims, 12 Drawing Sheets

TRANSMISSION HYDRAULIC CONTROL SYSTEM

TECHNICAL FIELD

This disclosure relates to the field of hydraulic control systems for automatic transmissions for motor vehicles.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

In addition to controlling the torque capacity of the shift elements, the valve body provides fluid for other purposes. These include providing fluid for lubrication and providing fluid to a torque converter. The fluid absorbs heat that is generated by friction within the transmission. To regulate the temperature of the transmission fluid, the fluid is routed through a heat exchanger.

Typically, the fluid is pressurized and circulated by an engine driven pump. However, some vehicles automatically shut off the engine when power is not required in order to reduce fuel consumption. Some of the functions provided by the fluid must be maintained during these periods of time.

When a vehicle is parked, the transmission may engage a parking pawl which holds the transmission shaft stationary to prevent the vehicle from rolling. The parking system is designed to remain engaged without consuming any power during extended unattended periods. Normally, the parking pawl is engaged in response to the driver selecting Park and is disengaged in response to the driver selecting any other range, such as Reverse, Neutral, Drive, or Low. However, there are some conditions in which the transmission may over-ride the driver selection.

SUMMARY OF THE DISCLOSURE

A transmission includes three shift elements engageable to establish a reverse ratio and a fourth shift element engageable in combination with the first and second shift elements to establish forward launch ratio. A park valve engages a park pawl in response to simultaneous engagement of the first and second shift elements and maintains the parking pawl in the disengaged state as long as the second or third shift elements are engaged. The transmission may also include a fifth shift element not engaged in either the reverse ratio or the forward launch ratio and a sixth shift element engaged in both the reverse ratio and the forward launch ratio. The park valve maintains the disengaged state as long as the fifth shift element or sixth shift element is engaged.

A method of controlling a transmission with six shift elements includes engaging first, second, and third shift elements while Park is selected and engaging a fourth shift element in response to the shift selector being moved out of the Park position in order to cause disengagement of the parking pawl. When the shift selector is moved to the Reverse position, the controller may first engage a fifth shift element, then engage the fourth shift element, then release the second shift element. When the shift selector is moved to the Drive position, the controller may first engage a sixth shift element, then engage the fourth shift element, then release the second shift element. In this way, five shift elements are engaged as the parking pawl is released. When the shift lever is returned to the Park position, the method may include reducing the torque capacities of the first, second, and third shift elements causing the parking pawl to re-engage.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
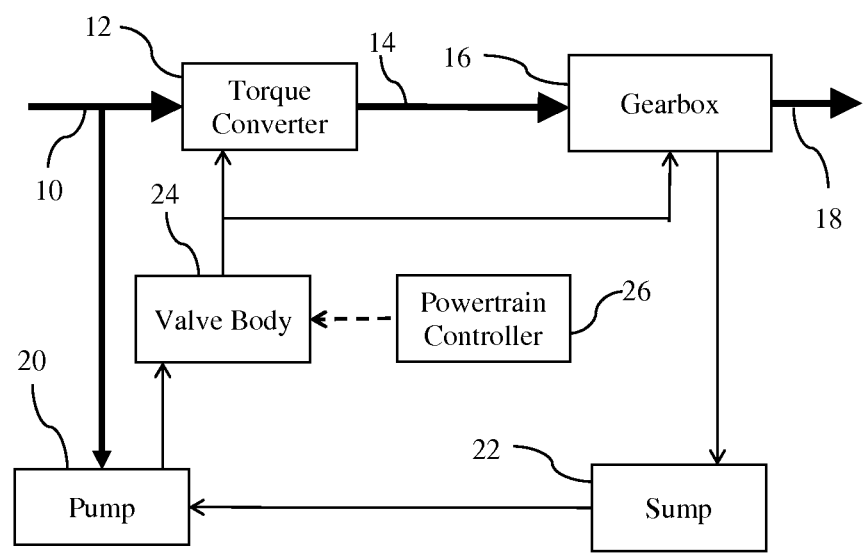
FIG. 1 is a schematic diagram of a transmission system.

FIG. 1 schematically illustrates a vehicle transmission. Bold solid lines represent mechanical power flow connections. Thin solid lines represent the flow of hydraulic fluid. Dashed lined represent the flow of information signals. Power is supplied at input shaft 10, generally from an internal combustion engine crankshaft. Fluid coupling 12 includes an impeller driveably connected to input shaft 10 and a turbine driveably connected to turbine shaft 14. Power is transmitted from the impeller to the turbine via moving fluid whenever the impeller rotates faster than the turbine. Fluid coupling 12 may be a torque converter which also includes a stator which redirects the fluid when the impeller is rotating substantially faster than the impeller such that the turbine torque is a multiple of the impeller torque. Gearbox 16 includes gearing and shift elements configured to establish various power flow paths between turbine shaft 14 and output shaft 18. Each power flow path may be established by engaging an associated subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

The shift elements within gearbox 16 are engaged by supplying hydraulic fluid at an elevated pressure to a clutch apply chamber. Each shift element may include a clutch pack having friction plates splined to one component interleaved with separator plates splined to a different component. The fluid forces a piston to squeeze the clutch pack such that frictional force between the friction plates and the separator plates couples the components. The torque capacity of each shift element varies in proportion to changes in the fluid pressure. Pump 20, driven by input shaft 10, draws fluid from sump 22 and delivers it at an elevated pressure to valve body 24. Valve body 24 delivers the fluid to the clutch apply chambers at a pressure controlled in accordance with signals from powertrain controller 26. In addition to the fluid provided to clutch apply chambers, valve body provides fluid for lubrication and provides fluid to torque converter 12. The fluid eventually drains from gearbox 18 back to sump 22 at ambient pressure.

Figure 2:
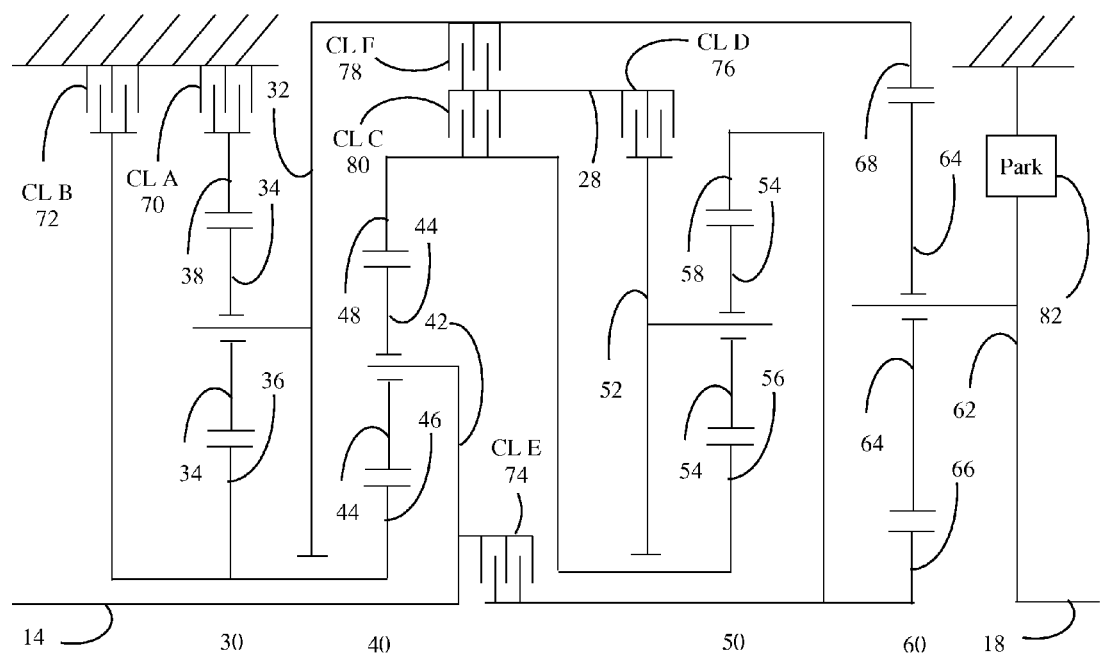
FIG. 2 is a schematic diagram of a transmission gearing arrangement suitable for the gearbox of the transmission system of FIG. 1.

An example transmission is schematically illustrated in FIG. 2. The transmission utilizes four simple planetary gear sets 30, 40, 50, and 60. Sun gear 36 is fixedly coupled to sun gear 46, carrier 32 is fixedly couple to ring gear 68, ring gear 48 is fixedly coupled to sun gear 56, ring gear 58 is fixedly coupled to sun gear 66, turbine shaft 14 is fixedly coupled to carrier 42, and output shaft 18 is fixedly coupled to carrier 62. Ring gear 38 is selectively held against rotation by brake 70 and sun gears 36 and 46 are selectively held against rotation by brake 72. Turbine shaft 14 is selectively coupled to ring gear 58 and sun gear 66 by clutch 74. Intermediate shaft 28 is selectively coupled to carrier 52 by clutch 76, selectively coupled to carrier 32 and ring gear 68 by clutch 78, and selectively coupled to ring gear 48 and sun gear 56 by clutch 80. A suggested ratio of gear teeth for each planetary gear set is listed in Table 1.

TABLE 1

| | |
|---|---|
| Ring 38/Sun 36 | 2.20 |
| Ring 48/Sun 46 | 1.75 |
| Ring 58/Sun 56 | 1.60 |
| Ring 68/Sun 66 | 3.70 |

As shown in Table 2, engaging the clutches and brakes in combinations of four establishes ten forward speed ratios and one reverse speed ratio between turbine shaft 14 and output shaft 18. An X indicates that the clutch is required to establish the speed ratio. An (X) indicates the clutch can be applied but is not required to establish the power flow path. In $1^{st}$ gear, either clutch 78 or clutch 80 can be applied instead of applying clutch 76 without changing the speed ratio. When the gear sets have tooth numbers as indicated in Table 1, the speed ratios have the values indicated in Table 2.

TABLE 2

| | A 70 | B 72 | C 80 | D 76 | E 74 | F 78 | Ratio | Step |
|---|---|---|---|---|---|---|---|---|
| Rev | X | X | | X | | X | -4.79 | 102% |
| Park | X | X | X | | | | | |
| $1^{st}$ | X | X | | (X) | X | | 4.70 | |
| $2^{nd}$ | X | | X | X | | | 2.99 | 1.57 |
| $3^{rd}$ | X | | X | X | X | | 2.18 | 1.37 |
| $4^{th}$ | X | | X | X | | X | 1.80 | 1.21 |
| $5^{th}$ | X | | X | | X | X | 1.54 | 1.17 |
| $6^{th}$ | X | | | X | X | X | 1.29 | 1.19 |
| $7^{th}$ | | | X | X | X | X | 1.00 | 1.29 |
| $8^{th}$ | | X | | X | X | X | 0.85 | 1.17 |
| $9^{th}$ | | X | X | | X | X | 0.69 | 1.24 |
| $10^{th}$ | | X | X | X | | X | 0.64 | 1.08 |

Parking pawl 82 selectively couples output shaft 18 to the transmission case to prevent vehicle movement when the vehicle is parked. Unlike shift elements 70-80, parking pawl 82 is designed to remain engaged without any external power once engaged. As illustrated in Table 2, shift elements 70, 72, and 80 may be engaged when the transmission is in Park. This combination does not establish a power flow path between turbine shaft 14 and output shaft 18. However, having several clutches already applied decreases the number of clutch engagements required to transition into reverse or 1st gear. Other combinations of three or fewer shift elements would also provide this benefit. Furthermore, it is advantageous to have the elements of the transmission held against rotation by hydraulic clutches as the parking pawl is released. This may be accomplished by engaging five of the six shift element. Then, the power flow path associated with either reverse of first gear is established by gradually releasing a shift elements. This sequence avoids the sudden jerk that may accompany release of the parking pawl while a power flow path is engaged. For example, to transition from Park to Reverse, elements D and F may be engaged prior to or simultaneous with disengagement of the parking pawl placing the transmission in a locked state with elements A, B, C, D, and F all engaged. Then, element C is gradually released to establish the Reverse power flow path. Similarly, to transition from Park to 1st, elements D and E may be engaged prior to or simultaneous with disengagement of the parking pawl placing the transmission in a locked state with elements A, B, C, D, and E all engaged. Then, element C is gradually released to establish the 1st gear power flow path.

Figure 3:
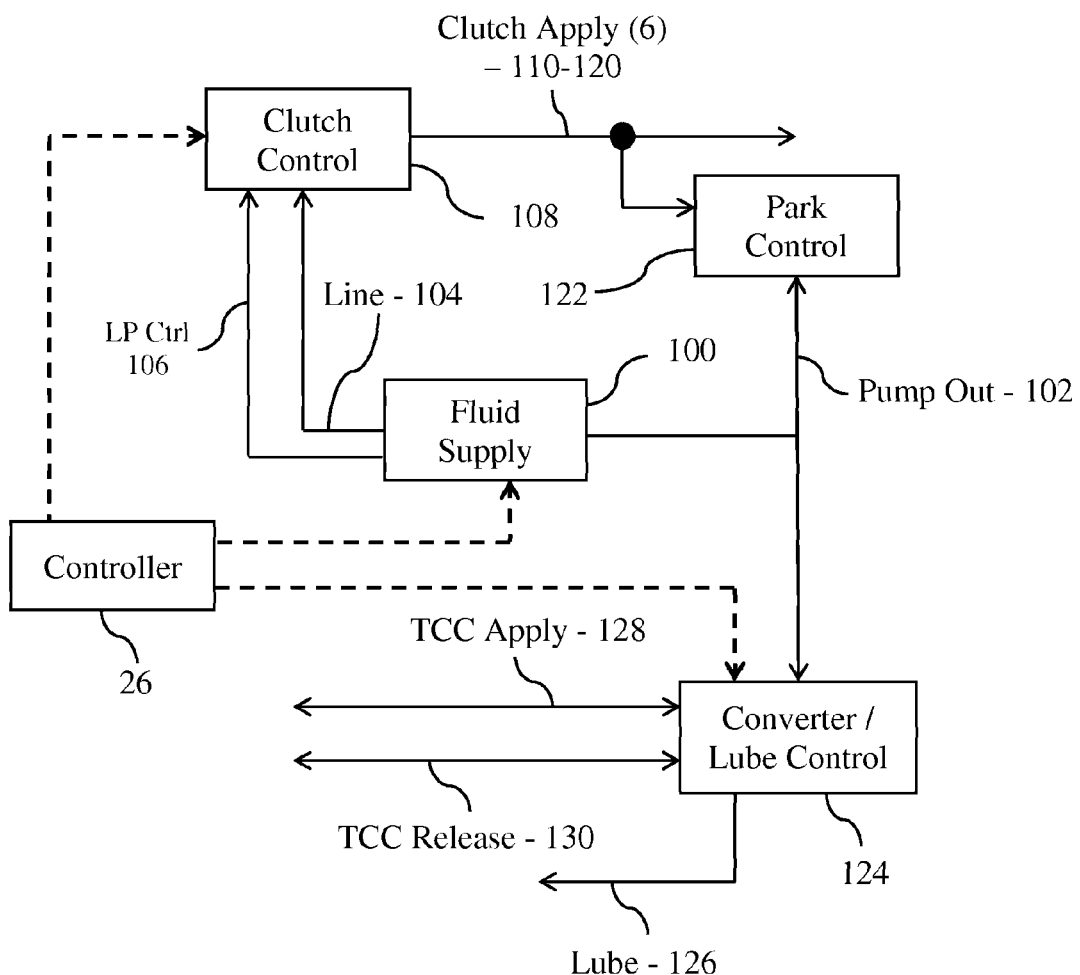
FIG. 3 is a high level schematic diagram of a hydraulic control system suitable for use with the transmission system of FIG. 1.

FIG. 3 schematically illustrates a hydraulic control system suitable for the transmission of FIG. 1 with the gearing arrangement of FIG. 2. Solid lines represent the flow of fluid and dashed lines represent information signals. A collection of fluid passageways connected to transport fluid such that the pressure is substantially equal at various locations within the collection may be called a hydraulic circuit. Slight variation in pressure within a hydraulic circuit may occur due to parasitic viscous drag of flowing fluid. A hydraulic circuits may be connected to another hydraulic circuit by an orifice that permits some fluid flow between the circuits but intentionally limits the flow rate and creates an intentional pressure differential when flow occurs. Hydraulic circuits may also be connected to one another by valves. A valve may block flow between the circuits in some circumstances, permit free flow with negligible pressure drop in other circumstances, and permit limited flow with intentional pressure drop in yet other circumstances.

Fluid supply subsystem 100 provides fluid at elevated pressure in three circuits: a pump output circuit 102, a line pressure circuit 104, and an LP Ctrl circuit 106. The pressure in these circuits varies in response to control signals from controller 26. Pump output circuit 102 and line pressure circuit 104 are designed to accommodate high fluid flow rates with minimal parasitic pressure drop. Clutch control subsystem 108 regulates the pressure in six clutch apply circuits, 110 through 120 to a pressure less than line pressure in response to signals from controller 26. Each of the six clutch apply circuits routes fluid to the apply chamber of one of the six shift elements of FIG. 2 respectively. Park control subsystem 122 mechanically engages and disengages parking pawl 82 in response to variations in the pressures in the clutch apply circuits. Converter/lube control subsystem 124 regulates the pressure and flow in a lubrication circuit 126, a torque converter clutch apply circuit 128, and a torque converter clutch release circuit 130. The structure and operation of each of these subsystems is discussed in more detail below.

Figure 4:
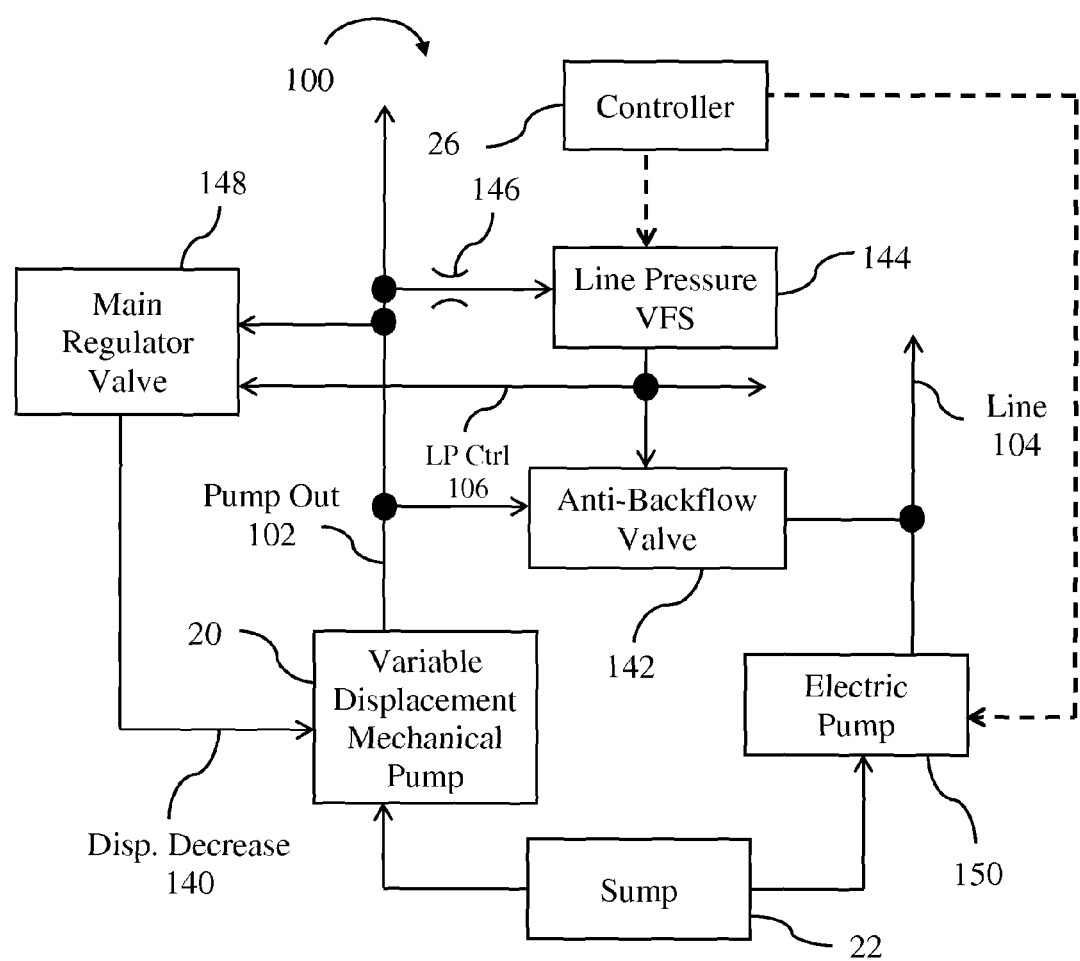
FIG. 4 is a schematic diagram of a fluid supply subsystem of the hydraulic control system of FIG. 3.

FIG. 4 schematically illustrates the fluid supply subsystem 100. Similar fluid supply subsystems are discussed in U.S. Patent Application Publications 2013/0014498 and 2013/0017112 which are incorporated by reference in their entirety herein. Pump 20, which is driven by the transmission input shaft, draws fluid from sump 22 and delivers the fluid to pump output circuit 102. Pump 20 is a positive displacement pump. Disregarding leakage, positive displacement pumps deliver a certain amount of fluid per revolution of the pump shaft regardless of the relative pressure at the pump inlet and pump outlet. The torque required to rotate the pump shaft increases as the pressure at the pump outlet increases relative to the pressure at the inlet. The amount of fluid delivered per revolution is called the pump displacement. The displacement of pump 20 varies within predefined limits based on the pressure in displacement decrease circuit 140.

During normal operation, anti-backflow valve 142 is open such that fluid flows freely from the pump outlet circuit 102 to the line pressure circuit 104 and the pressure in the two circuits is substantially equal. The controller adjust the pressure in these two circuits by sending a command to line pressure Variable Force Solenoid (VFS) 144. Fluid flows from the pump out circuit 102, through an orifice 146, through a valve opening in line pressure VFS 144 and then into LP Ctrl circuit 106. The pressure drop from the pump output circuit 102 to the LP Ctrl circuit 106 varies depending upon the size of the opening in line pressure VFS 144. The size of the opening in line pressure VFS 144 varies based on movement of a spool. Electrical current from controller 26 creates a magnetic force on the spool tending to enlarge the opening. Fluid in the LP Ctrl circuit 106 acts on an area of the spool to create a force tending to reduce the size of the opening. An equilibrium is reached at which the pressure in the LP Ctrl circuit 106 is proportional to the electrical current.

Main regulator valve 148 adjusts the displacement of pump 20 in order to maintain the pressure in pump out circuit 102 proportional to the pressure in the LP Ctrl circuit 106. Pressure in the LP Ctrl circuit 106 generates a force on a spool in main regulator valve 148. Pressure in the pump out circuit 102 generates a force on the spool valve in the opposite direction. When the pressure in the pump out circuit 102 exceeds the pressure in the LP Ctrl circuit, the spool moves to allow flow from pump out circuit 102 to displacement decrease circuit 140. Pressure in circuit 140 causes a reduction in the flow rate from pump 20 into the pump out circuit 102. Components fed by the pump out circuit 102 and the line pressure circuit 104 establish a relationship between the pressure in these circuits and the flow rate. Consequently, the reduction in flow rate results in a reduction in the pressure in pump out circuit 102 until an equilibrium is reached.

When the vehicle is stopped, such as when waiting at a traffic light, powertrain controller 26 may shut off the engine to conserve fuel. When the driver again demands torque by releasing the brake and depressing the accelerator pedal, the controller restarts the engine. In order to respond quickly after the engine is restarted, it is important to maintain some clutches in an engaged state. Fluid flow to maintain these clutches is provided by electrically driven pump 150 which directly feeds line pressure circuit 104. During engine shutdown periods, controller 26 adjusts the pressure in line pressure circuit 104 by controlling the speed of the electric motor driving pump 150. Controller 26 stops supplying current to line pressure VFS 144 causing the pressure in LP Ctrl circuit 106 to drop to ambient pressure. In response to this reduction in LP Ctrl pressure, anti-backflow valve 142 closes to prevent flow from line pressure circuit 104 to pump out circuit 102. Therefore, when the engine is shut down, the pressure in pump out circuit 102 drops to ambient pressure.

Figure 5:
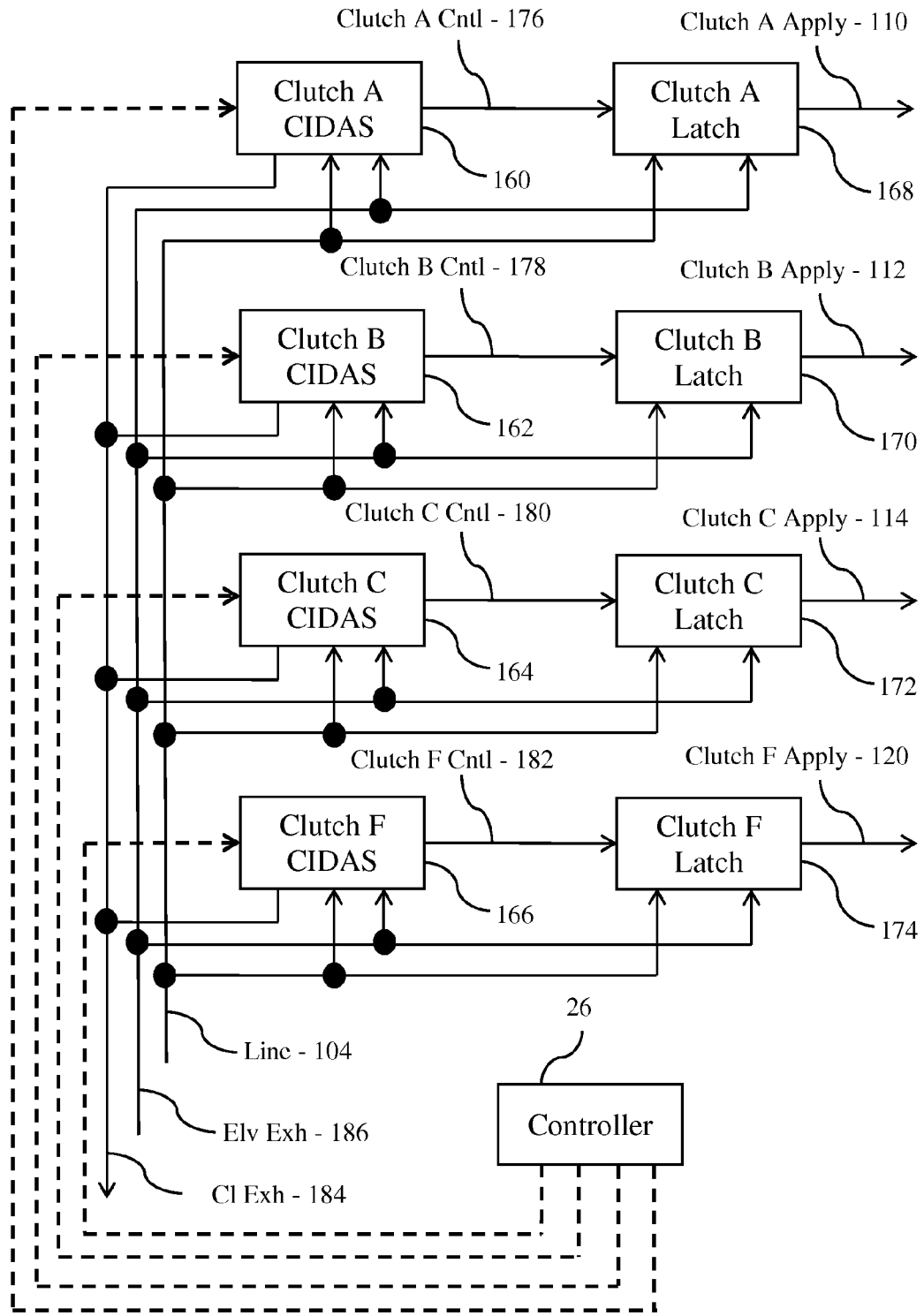
FIG. 5 is a schematic diagram of a first portion of a clutch control subsystem of the hydraulic control system of FIG. 3 suitable for use to control four of the shift elements of the gearing arrangement of FIG. 2.
Figure 6:
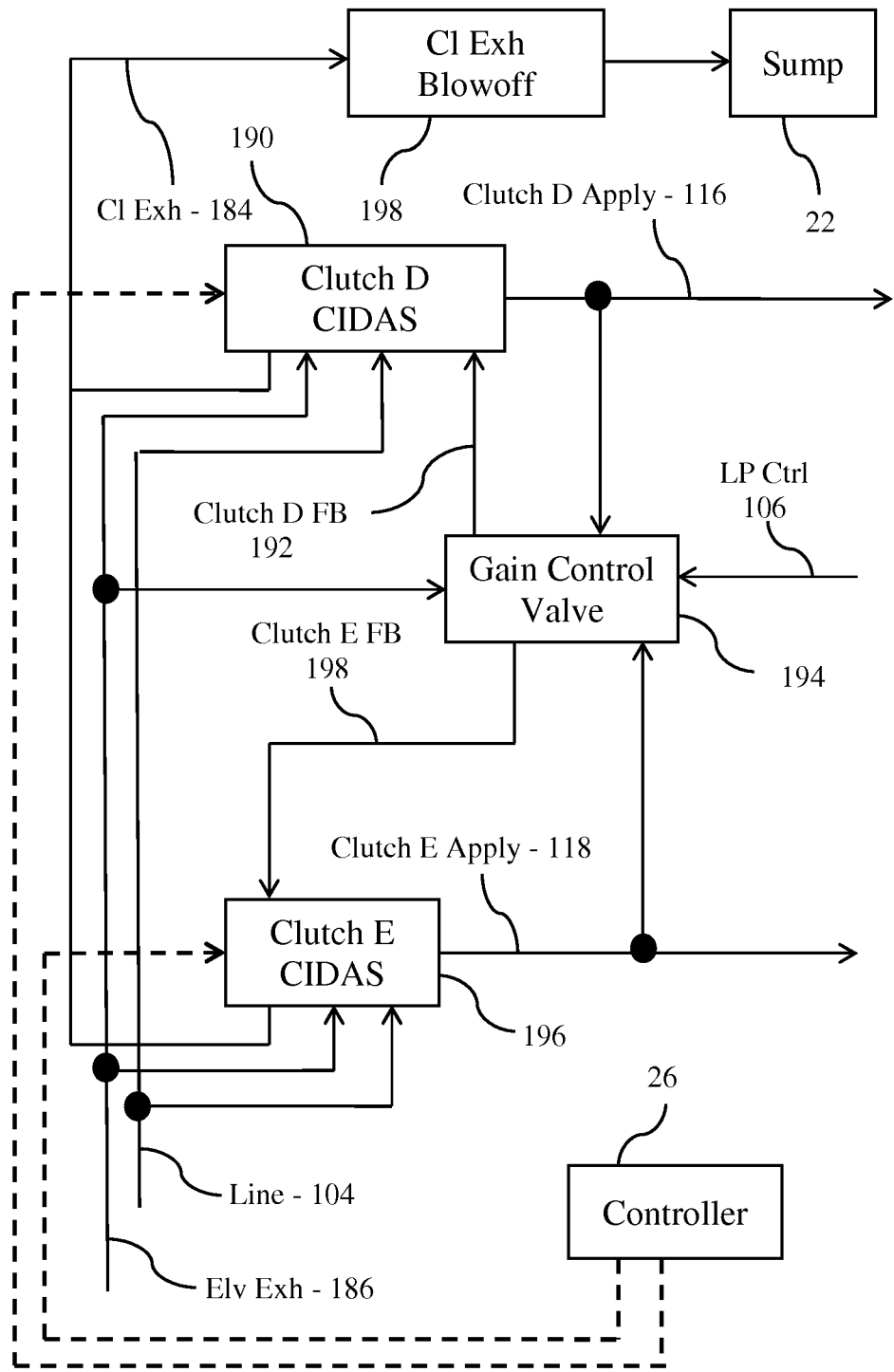
FIG. 6 is a schematic diagram of a second portion of a clutch control subsystem of the hydraulic control system of FIG. 3 suitable for use to control two of the shift elements of the gearing arrangement of FIG. 2.

FIGS. 5 and 6 schematically illustrate the clutch control subsystem 108. Controller 26 adjusts the torque capacity of each clutch by adjusting an electrical current to a corresponding solenoid. During a shift, accurate control of the torque capacity of the on-coming and off-going clutches is very important. The relationship between changes in the electrical current and changes in torque capacity is called the gain. If the gain is too high, then accuracy of torque capacity control suffers. The torque capacity of engaged clutches while in a fixed gear or holding clutches during a shift must be maintained higher than the transmitted torque in order to avoid clutch slip. Sometimes, these requirements are in tension with one another. For example, in reverse, the torque capacity of brake A must be maintained at more than three and a half times the gearbox input torque. In $6^{th}$ gear, on the other hand, the torque transmitted by brake A is less than 30% of the gearbox input torque. Brake A is the off-going element in a shift from $6^{th}$ gear to $7^{th}$ gear. During this shift, which may occur at relatively low gearbox input torque, a low gain is required. However, this same low gain would not be suitable in reverse gear at relatively high gearbox input torque.

FIG. 5 illustrates the components that control four of the six shift elements of the gearing arrangement of FIG. 2, CL A 70, CL B 72, CL C 80, and CL F 78. Each clutch apply circuit is controlled by the combination of a Casting-Integrated Direct-Acting Solenoid (CIDAS) 160, 162, 164, or 166 and a corresponding latch valve 168, 170, 172, or 174. Each CIDAS controls the pressure in a corresponding controlled pressure circuit 176, 178, 180, or 182 in response to a control signal from controller 26. Each latch valve connects a clutch apply circuit to a corresponding controlled pressure circuit when the pressure in the controlled pressure circuit is below a threshold and connects the clutch apply circuit to line pressure circuit 104 when the controlled pressure is above the threshold. This arrangement enables use of a low gain during shift events and yet provides high torque capacity at other times. The thresholds and gains may vary among the various clutches. When a controlled pressure is commanded to zero, the CIDAS valve connects the controlled pressure circuit to clutch exhaust circuit 184 which provides a path for fluid to escape from the clutch apply chamber to de-stroke the clutch piston. Elevated exhaust circuit 186 provides a supply of fluid at very near ambient pressure. The structure and operation of a CIDAS/latch valve combination is described in detail in U.S. Patent Application Publication 2013/0026401 which is incorporated by reference in its entirety herein.

FIG. 6 illustrates the components that control the other two of the six shift elements of the gearing arrangement of FIG. 2, CL D 76 and CL E 74. Fluid flows from line pressure circuit 104, through an opening in Clutch D CIDAS 190 into Clutch D apply circuit 116. The size of the opening varies depending upon the position of a spool in CIDAS 190. An electrical signal from controller 26 creates a magnetic force pushing the spool in one direction tending to increase the size of the opening. Fluid in the clutch D apply circuit 116 acts on an area of the spool tending to push the spool in the opposite direction and reduce the size of the opening. Additionally, fluid in the clutch D feedback circuit 192 acts on a second area also tending to reduce the size of the opening. The pressure drop between the line pressure circuit and the clutch D apply circuit is related to the size of the opening. An equilibrium is reached at which the pressure in the clutch D apply circuit is proportional to the electrical current. The coefficient of proportionality, or gain, is determined by gain control valve 194. When the pressure in the LP Ctrl circuit 106 is above a threshold, gain control valve 194 connects the clutch D feedback circuit 192 to the elevated exhaust circuit 186. In this condition, the gain is relatively high because the pressure in the clutch D apply circuit acts only on the first area of the spool. When the pressure in the LP Ctrl circuit 106 is below the threshold, gain control valve 194 connects the clutch D feedback circuit 192 to the clutch D apply circuit 116. In this condition, the gain is relatively low because the pressure in the clutch D apply circuit acts only on both the first and second areas of the spool. Similarly, clutch E CIDAS 196 and gain control valve 194 cooperatively control the pressure in clutch E apply circuit with two different gains. The structure and operation of a combination of valves 190, 194, and 196 is described in detail in U.S. Patent Application Publication 2014/0182693 which is incorporated by reference in its entirety herein. In an alternative embodiment, gain control valve 194 could be controlled by a separate signal from controller 26. Blowoff valve 198 exhausts the clutch exhaust circuit 184 from all six clutches to the sump, maintaining a slight positive pressure such that the circuit does not become evacuated.

Figure 7:
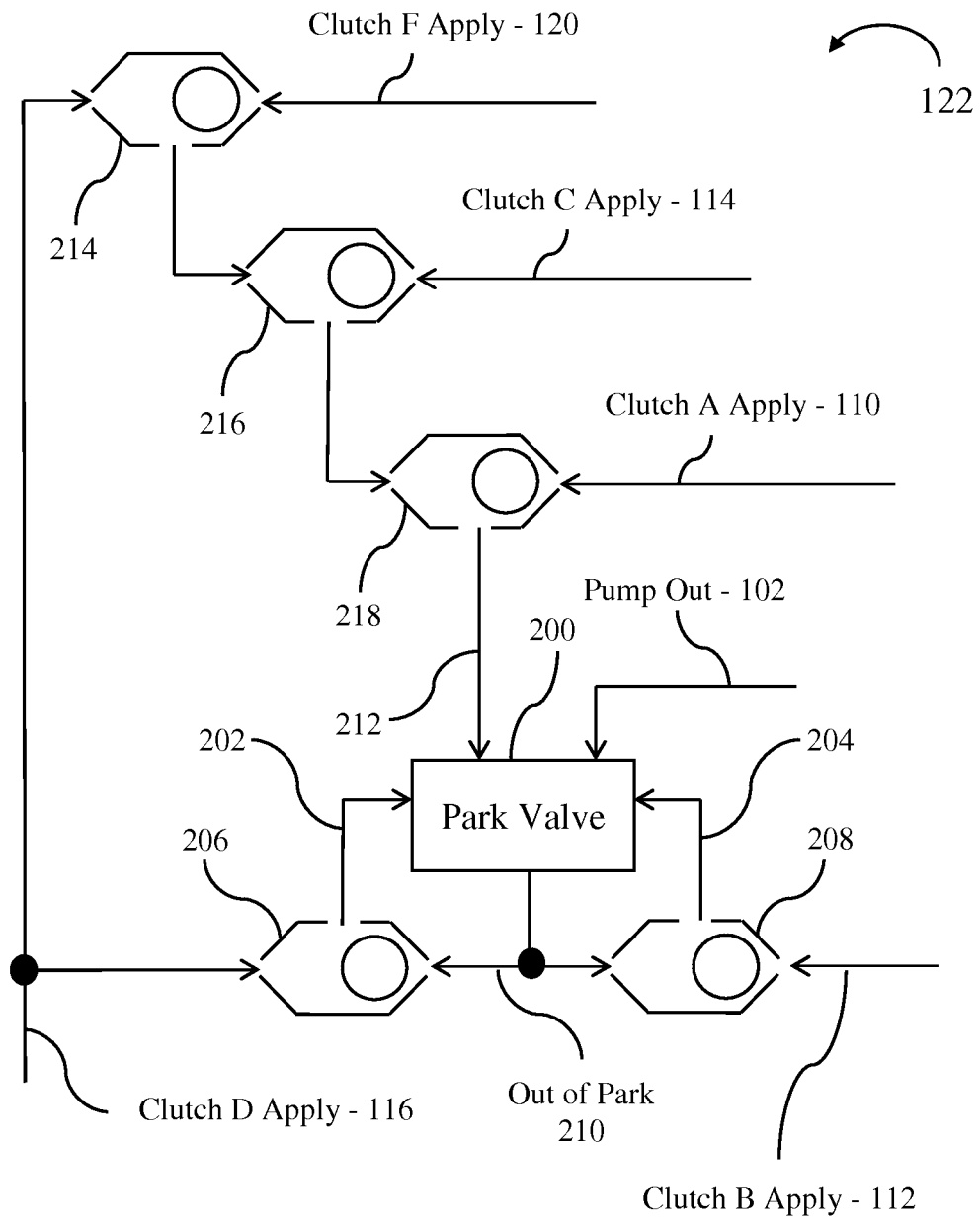
FIG. 7 is a schematic diagram of a park subsystem of the hydraulic control system of FIG. 3.

FIG. 7 schematically illustrates the park control subsystem. A similar system is described in detail in U.S. Patent Application Publication 2014/0284170 which is incorporated by reference in its entirety herein. The spool of park valve 200 is mechanically linked to the park mechanism 82, such that movement in one direction engages the park mechanism and movement in the opposite direction disengages the park mechanism. A spring within the park mechanism biases the system toward engagement. Also, the pump out circuit 102 acts on an area of the spool which forces the spool toward engagement. Circuits 202 and 204 act on areas of the spool tending to push the spool in the disengagement direction. The areas on which these circuits act are balanced such that pressure in both circuit 202 and circuit 204 must be near the pressure in pump out circuit 102 in order to push the spool into the disengaged position. When the pressure in clutch D apply circuit 116 is high, ball valve 206 connects circuit 116 to circuit 202. Similarly, when the pressure in clutch B apply circuit 112 is high, ball valve 208 connects circuit 112 to circuit 204. Thus, park may be disengaged by simultaneously commanding high pressure to clutch apply circuits 112 and 116.

Once the spool moves into the disengaged position, the valve connects out of park circuit 210 to circuit 212. Ball valves 214, 216, and 218 connect circuit 212 to one of clutch D apply 116, clutch F apply 120, clutch C apply 114, or clutch A apply 110, whichever has the highest pressure. Thus, circuit 212 is pressurized at close to line pressure whenever at least one of these clutches is commanded to fully engaged. Whenever the pressure in out of park circuit 210 is higher clutch D apply 116 or clutch B apply 112, ball valves 206 and 208 connect the out of park circuit to circuits 202 and 204 respectively. Thus, once park is disengaged, it remains disengaged as long as at least one of clutches A, C, D, and F are fully engaged, even if the clutches that were engaged in order to cause the transition are released. As shown in Table 2, every gear state involves engagement of at least two of these clutches. Furthermore, every shift in which one element is released and another is engaged would have at least one of these four clutches as a holding clutch. As discussed above with regard to the fluid supply subsystem, the engine may sometimes be shut off while the vehicle is stationary. An electric pump maintains pressure in the line pressure circuit while the engine is shut down. Therefore, as long as full pressure is commanded for at least one of clutches A, C, D, or F, the vehicle stays out of park during these engine shut down events. To re-engage park, all of these clutches must be commanded to a lower pressure, which can be done without completely disengaging the clutches.

Figure 8:
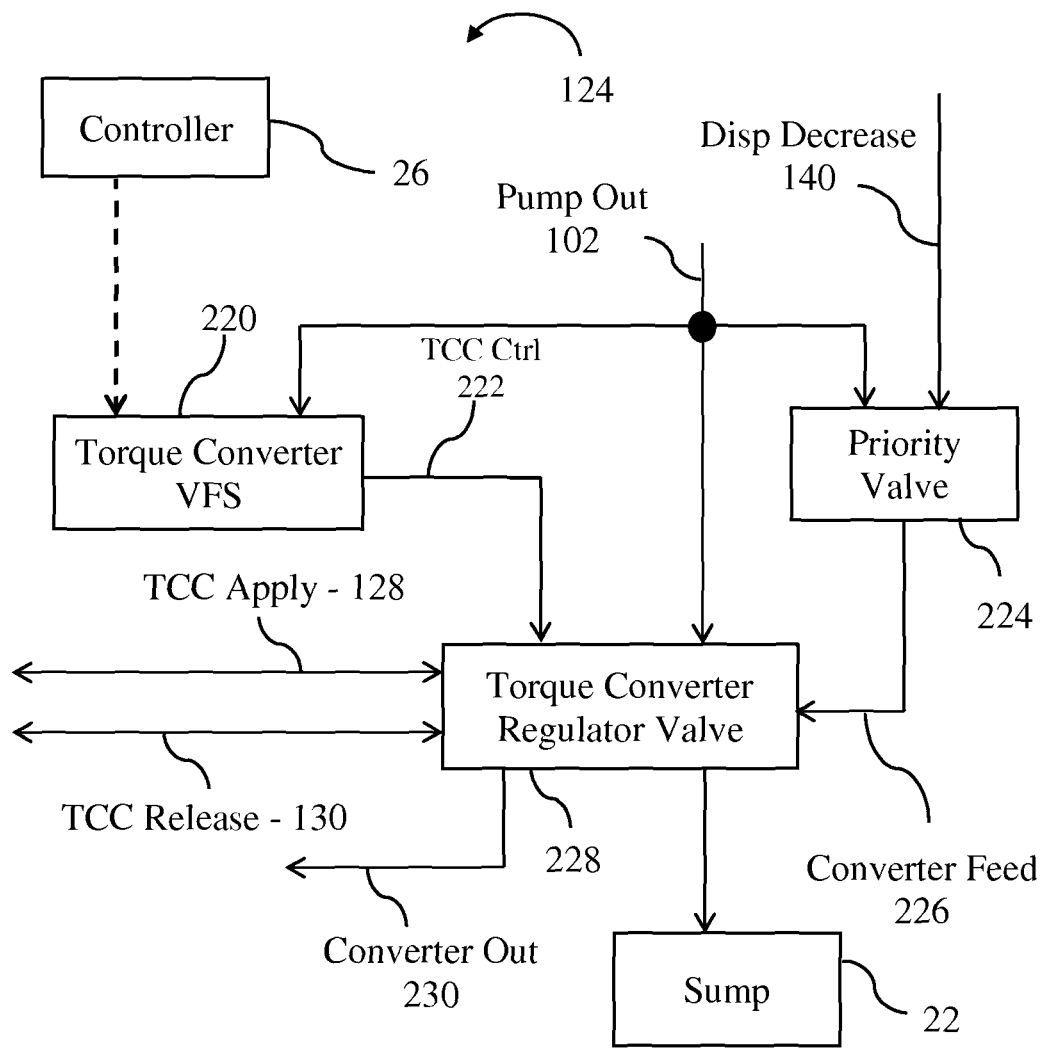
FIG. 8 is a schematic diagram of a first portion of a converter/lube control subsystem of the hydraulic control system of FIG. 3.

FIG. 8 illustrates the portion of the lube and converter control subsystem 124 that controls the torque converter. The system is designed to operate a two-pass type torque converter. As the name implies, a two-pass torque converter utilizes only two hydraulic circuits to i) feed fresh fluid to the converter, ii) return fluid from the converter, and iii) to control the torque capacity of the lock-up clutch. When the lock-up clutch is disengaged, fluid flows into the torque converter in TCC release circuit 130 and flows out of the converter in TCC apply circuit 128. On the other hand, when the lock-up clutch is engaged, fluid flows into the converter in TCC apply circuit 128 and flows out of the converter in TCC release circuit 130 with the pressure difference between these circuits controlling the torque capacity of the lock-up clutch. This contrasts with a three-pass type torque converter in which a separate circuit is dedicated to each of the functions.

Controller 26 indicates the desired lock-up clutch torque capacity by adjusting an electrical signal. Fluid flows through an opening in Torque Converter Mini-Direct-Acting solenoid valve 220 from pump out circuit 102 to TCC Ctrl circuit 222. The valve controls the size of the opening, and therefore the pressure drop between these circuits, such that the pressure in TCC Ctrl circuit 222 is proportional to the electrical signal. Under normal operating conditions, priority valve 224 connects the pump out circuit 102 to the converter feed circuit 226. The converter feed circuit 226 supplies fresh fluid to the torque converter. As discussed below, the converter feed circuit also supplies fluid to a lubrication circuit. In circumstances where the pump is unable to maintain the desired line pressure, priority valve 224 temporarily reduces and may even shut off flow to converter feed circuit 226. Priority valve 224 determines that this condition exists based on the pressure in displacement decrease circuit 140. Recall that main regulator valve 148 increases the pressure in this circuit when there is excess flow available in order to reduce the flow rate. A pressure below a threshold in the displacement decrease circuit 140 implies that the main regulator is requesting full displacement and the pump is still not generating enough flow. This can happen, for example, when a large flow rate is dedicated to moving a clutch piston to a stroked position.

Torque converter regulator valve 228 performs several functions, all in response to the TCC Ctrl pressure. Pressure below a threshold in the TCC Ctrl circuit 222 implies that the lockup clutch should be disengaged. In response, valve 228 i) connects converter feed circuit 226 to TCC release circuit 130, and ii) connects TCC apply circuit 128 to converter out circuit 230. As discussed below, converter out circuit 230 supplies fluid for lubrication. When the pressure in the TCC Ctrl circuit 222 is above the threshold, valve 228 i) connects the pump out circuit 102 to the TCC apply circuit 128 through a variable size opening, ii) adjust the size of the opening such that the pressure in the TCC apply circuit is proportional to the pressure in the TCC Ctrl circuit 222, iii) connects the TCC release circuit 130 to the sump 22, and iv) connects the converter feed circuit 226 to the converter out circuit 230.

Figure 9A:
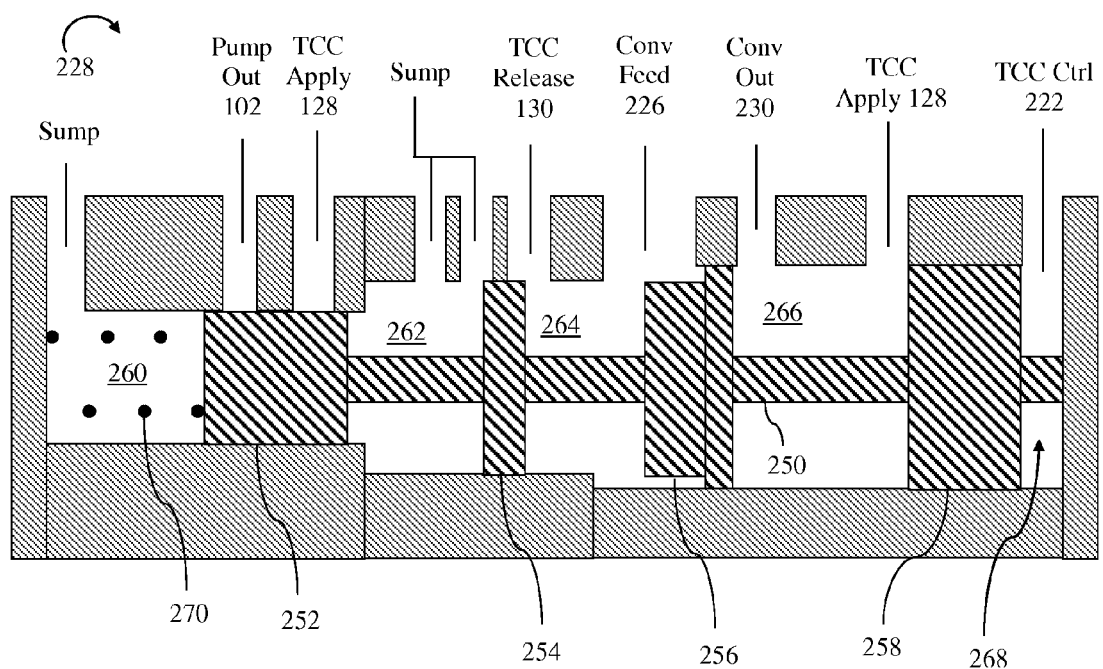
FIGS. 9a, 9b, and 9c illustrate a spool valve, in three positions respectively, suitable for use as the torque converter regulator valve of the fluid supply subsystem of FIG. 8.
Figure 9B:
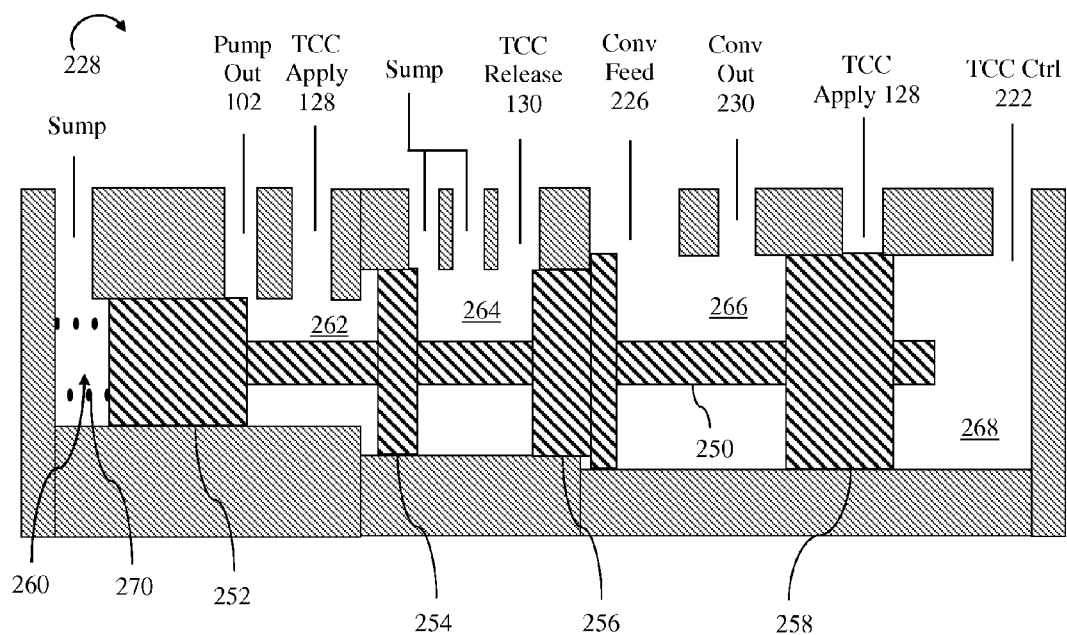

FIGS. 9a and 9b illustrate a cross section of torque converter regulator valve 228. Spool 250 slides axially within a valve bore. Spool 250 includes four spool lands 252, 254, 256, and 258 to define a number of chambers. Chamber 260 is between a fixed wall on the left end of the bore and land 252. Chamber 262 is between land 252 and land 254. Chamber 264 is between land 254 and land 256. Chamber 266 is between land 256 and land 258. Finally, chamber 268 is between land 268 and a fixed wall on the right end of the bore. Compression spring 270 tends to push the spool toward the right. A number of openings in the side of the valve bore, called ports, connect particular chambers to particular hydraulic circuits of the hydraulic control system. Which chamber(s) a particular circuit is connected to may depend upon the position of spool 250. Also, the size of the port opening may depend upon the position of the spool 250.

FIG. 9a illustrates the regulator valve with the spool in the position corresponding to an open torque converter. The TCC Ctrl circuit 222 is connected to chamber 268 such that pressure in the circuit tends to push spool 250 toward the left. When the TCC Ctrl pressure is below a threshold, spring 270 pushes spool 250 into the position shown in FIG. 9a. In this position, both chambers 260 and 262 are vented to sump, so the pressure in these chambers is negligible. Chamber 264 is connected to both TCC release circuit 130 and converter feed circuit 226 permitting fluid flow from converter feed circuit 226 to TCC release circuit 130 to release the bypass clutch and provide fresh fluid to the hydrodynamic torque converter. Chamber 266 is connected to both converter out circuit 230 and TCC apply circuit 128 permitting fluid exiting the torque converter in TCC apply circuit 128 to flow through the converter out circuit 230 into the cooler and lube circuit.

FIG. 9b illustrates the regulator valve with the spool in the position corresponding to a locked or slipping torque converter. Pressure in TCC Ctrl circuit 222 is sufficient to overcome spring 270 to push spool 250 to the left. Fluid flows into chamber 262 from pump out circuit 102 and from there to the TCC apply circuit 128. The size of the opening between pump out circuit 102 and chamber 262 depends upon the position of spool 250. Due to pressure drop across this restricted opening, the pressure in chamber 262 is less than the pressure in pump out circuit 102. Land 254 has a larger diameter than land 252 such that pressure in chamber 262 tends to push spool 250 to the right. Spool 250 moves to an equilibrium position such that the rightward force from chamber 262 and the spring force balance the leftward force from chamber 268. At the equilibrium, the pressure in chamber 262, and therefore the pressure in TCC apply circuit 128, is a function of the pressure in TCC Ctrl circuit 222. TCC release circuit 130 is vented to sump through chamber 264. Fluid flows from converter feed circuit 226 to converter out circuit 230 through chamber 266.

This one valve 250 accomplishes multiple functions associated with operation of the two pass torque converter. In the released state of FIG. 9a, i) fluid is routed from a flow source (converter feed circuit 226) to the converter release circuit 130, and ii) fluid is routed from converter apply circuit 128 to a lubrication circuit via converter out circuit 230. In the applied state of FIG. 9b, i) fluid is routed to converter apply circuit 128 at a pressure based on the pressure in a control circuit (TCC Ctrl 222), ii) fluid is routed from the flow source (converter feed circuit 226) to the lubrication circuit via converter out circuit 230, and iii) fluid is exhausted from the converter release circuit 130 to sump. Accomplishing all of these function in a single valve avoids possible error states that could occur if the functions are performed by multiple valves. When the functions are performed in multiple valves, the switching from an applied state to a released state or vice versa requires multiple valves to change position. If one of the valves fails to change position, the resulting inconsistent connections among circuits may starve the torque converter or the lubrication circuit of fresh fluid. Valves may stick in position, for example, due to contamination by small particles. Provisions to detect and mitigate such an error state add considerable complexity and cost to the control system.

Figure 9C:
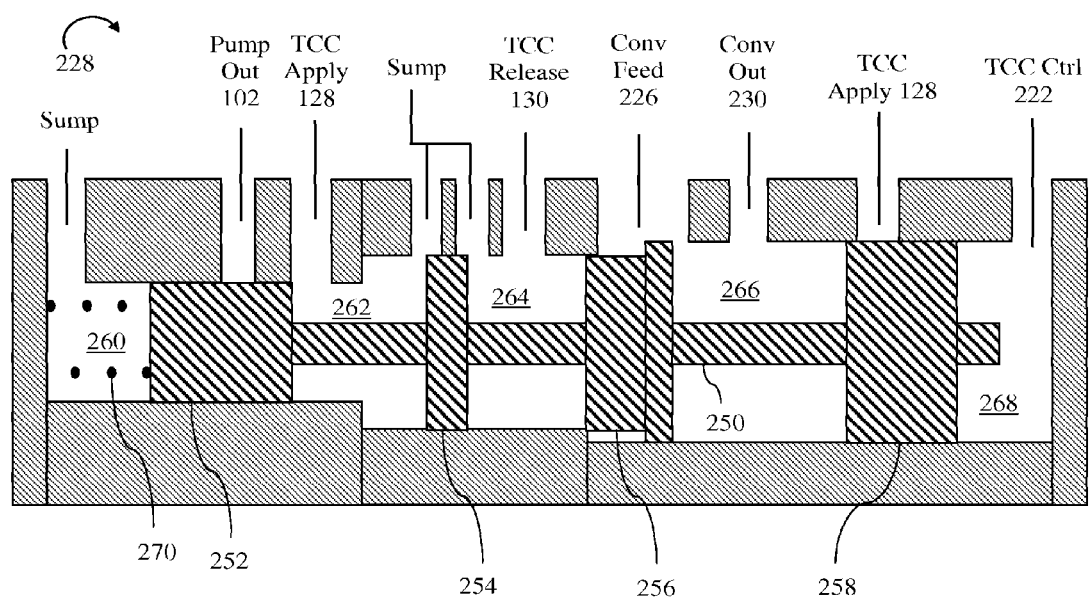

Valve 150 is designed to mitigate the error modes of a stuck valve. If valve 150 sticks in either the applied or released position when commanded to the opposite position, the circuits are connected in a consistent state that will provide lubrication fluid. If the torque converter bypass clutch is released, such that heat is generated in the torque converter, then the torque converter is supplied with fresh fluid to remove the heat. FIG. 9c shows the valve stuck in an intermediate position. In this position, chamber 266 connects the converter feed to the converter out circuit such that flow to the lubrication circuit is not interrupted. Also, both chambers 262 and 264 are vented to sump, although via separate circuits. As a result, fluid from the torque converter will tend to drain to sump though one of these circuits and be replaced with air through the other circuit. As the fluid drain out of the torque converter, the K-factor of the converter increases (the converter becomes "looser"). The controller can detect this change by comparing a measured turbine speed and impeller speed to a predicted speed based on the torque level. In response to detecting this K factor change after attempting to transition from applied to released, the controller may increase the pressure in the TCC Ctrl circuit to return to the applied state. Similarly, if the error state is detected after an attempt to transition from released to applied, the controller may return to the released state. The transmission may be operated indefinitely in the released state, although fuel economy may be adversely impacted. If the vehicle come to a stop while the transmission is being operated in the applied state, the controller may release on of the shifting clutches to enter a neutral state. A shifting clutch may then be utilized as a launch clutch while the vehicle is driven to a service facility.

Figure 10:
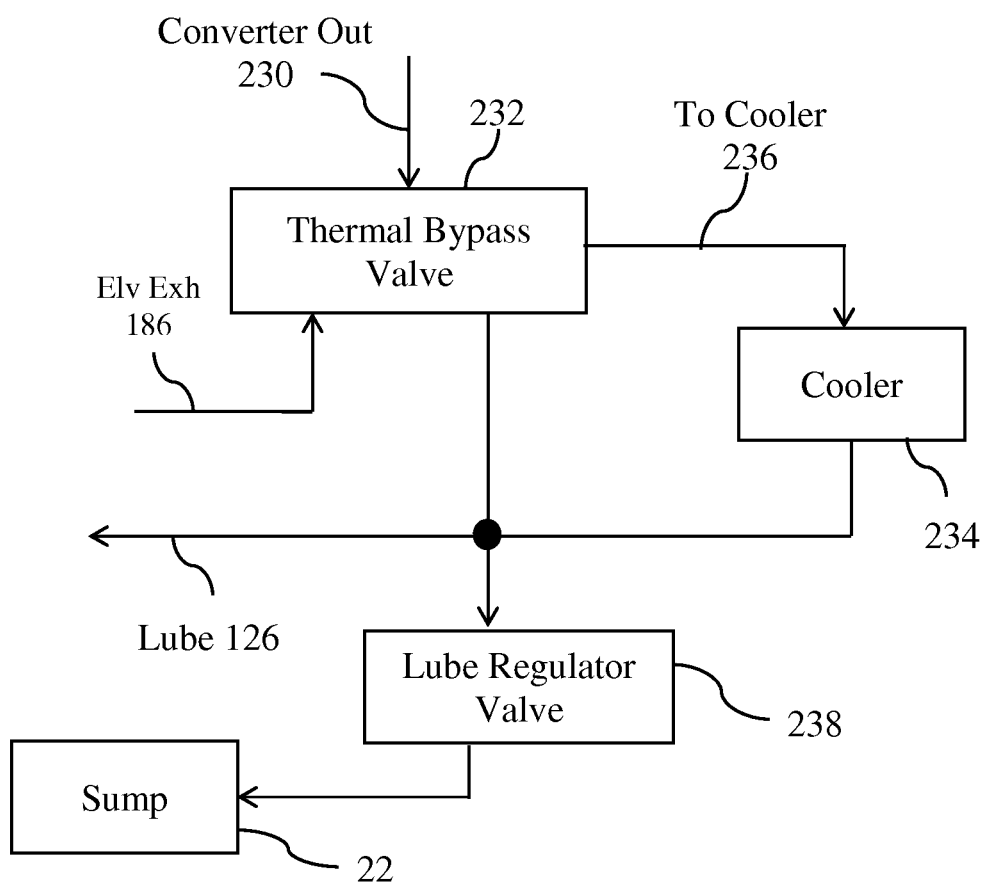
FIG. 10 is a schematic diagram of a second portion of a converter/lube control subsystem of the hydraulic control system of FIG. 3.

FIG. 10 illustrates the portion of the lube and converter control subsystem 124 that controls flow from the converter out circuit 230 to the lubrication circuit 126. Thermal bypass valve 232 determines whether to connect the converter out circuit 230 directly to the lube circuit 126 or whether to routes it through cooler 234 via cooler circuit 236. Thermal bypass valve is a passively controlled valve that routes the fluid based on the temperature in elevated exhaust circuit 186. When the temperature is above a threshold, the fluid is routed through the cooler. When the temperature is in the normal operating range, the fluid is routed directly to lube circuit 126. In some applications, the fluid may also be routed through the cooler when the temperature is below the normal operating range. The cooler may be a heat exchanger between transmission fluid and engine coolant. Since the engine typically warms up faster, the cooler may function as a heat source for the transmission fluid during the warm-up period, providing faster warm-up. Since cold fluid has substantially higher viscosity, warming it up quicker reduces fuel consumption. The structure and operation of valve 232 is discussed in detail in U.S. patent application Ser. No. 14/282,051 filed May 20, 2014 which is incorporated by reference in its entirety herein. Lube regulator valve 238 permits some fluid to flow from lube circuit 126 to sump 22 through a controlled opening in order to maintain a desire pressure in lube circuit 126.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
    first, second, and third shift elements engageable in combination to establish a reverse transmission ratio;
    a fourth shift element engageable in combination with the first and second shift elements to establish a forward launch transmission ratio;
    first, second, third, and fourth hydraulic circuits configured to engage the first, second, third, and fourth shift elements respectively in response to pressurization of the respective hydraulic circuit;
    a parking pawl engageable to hold a transmission output shaft against rotation; and
    a park valve configured to disengage the parking pawl in response to simultaneous pressurization of the first and second hydraulic circuits and then to maintain the parking pawl in a disengaged state in response to pressurization of either of the second or third hydraulic circuits.

2. The transmission of claim 1 further comprising:
    a fifth shift element; and
    a fifth hydraulic circuit configured to engage the fifth shift element in response to pressurization of the fifth hydraulic circuit.

3. The transmission of claim 2 wherein the park valve is further configured to maintain the parking pawl in the disengaged state in response to pressurization of the fifth hydraulic circuit.

4. The transmission of claim 2 further comprising:
    a sixth shift element engageable in combination with the first, second, and third shift element to establish the reverse transmission ratio and engageable in combination with the first, second, and fourth shift elements to establish the forward launch transmission ratio; and
    a sixth hydraulic circuit configured to engage the sixth shift element in response to pressurization of the sixth hydraulic circuit.

5. The transmission of claim 4 wherein the park valve is further configured to maintain the parking pawl in the disengaged state in response to pressurization of the sixth hydraulic circuit.

6. The transmission of claim 5 further comprising:
    a controller programmed to
        command engagement of the first, fifth, and sixth shift elements in response to a shift selector being in a Park position and
        in response to movement of the shift selector from the Park position, command engagement of the second shift element causing disengagement of the parking pawl.

7. The transmission of claim 6 wherein the controller is further programmed to respond to movement of the shift selector into a Reverse position by commanding engagement of the third shift element and release of the fifth shift element.

8. The transmission of claim 6 wherein the controller is further programmed to respond to movement of the shift selector into a Drive position by commanding engagement of the fourth shift element and release of the fifth shift element.

9. The transmission of claim 6 wherein the controller is further programmed to respond to movement of the shift selector into the Park position by reducing torque capacities of the first, fourth, and fifth shift elements causing engagement of the parking pawl.

10. The transmission of claim 1 further comprising:
    control valves configured to route fluid from a line pressure circuit to the first through fourth hydraulic circuits and to control fluid pressures in the first through fourth circuits in response to commands from a controller;

a pump configured to supply pressurized fluid to the line pressure circuit in response to rotation of a transmission input shaft; and an electrically driven pump configured to supply pressurized fluid to the line pressure circuit when the transmission input shaft is not rotating.

11. A hydraulic control system comprising:

first, second, third, fourth, and fifth clutch apply circuits; and a park valve configured to disengage a parking pawl in response to simultaneous pressurization of the first and second clutch apply circuits and then to maintain the parking pawl in a disengaged state in response to pressurization of any of the second through fifth clutch apply circuits.

12. The hydraulic control system of claim 11 further comprising a sixth clutch apply circuit.

13. The hydraulic control system of claim 11 wherein:

the park valve is configured to disengage park in response to pressure in a first input circuit and a second input circuit and is configured to fluidly connect an out-of-park circuit to a third input circuit whenever park is disengaged;

a first check valve configured to set the pressure in the first input circuit to a maximum of the pressure in the out-of-park circuit and a pressure in the first clutch apply circuit;

a second check valve configured to set the pressure in the second input circuit to a maximum of the pressure in the out-of-park circuit and a pressure in the second clutch apply circuit; and a plurality of check valves configured to set the pressure in the third input circuit to a maximum of pressures in the first, third, fourth, and fifth clutch apply circuits.

14. A method of operating a transmission having first through sixth shift elements comprising:

commanding engagement of the first, second, and third shift elements in response to a shift selector being in a Park position; and in response to movement of the shift selector from the Park position, disengaging a parking pawl by commanding engagement of the fourth shift element.

15. The method of claim 14 further comprising:

in response to movement of the shift selector into a Reverse position, commanding engagement of the fifth shift element and release of the second shift element.

16. The method of claim 15 wherein engagement of the fourth shift element occurs after engagement of the fifth shift element and before release of the second shift element such that five shift elements are engaged as the parking pawl is disengaged.

17. The method of claim 14 further comprising:

in response to movement of the shift selector into a Drive position, commanding engagement of the sixth shift element and release of the second shift element.

18. The method of claim 17 wherein engagement of the fourth shift element occurs after engagement of the sixth shift element and before release of the second shift element such that five shift elements are engaged as the parking pawl is disengaged.

19. The method of claim 14 further comprising:

in response to movement of the shift selector into the Park position, engaging the parking pawl by reducing torque capacities of the first, second, and third shift elements.

* * * * *